United States Patent [19]

Ottman

[11] 4,153,404

[45] May 8, 1979

[54] APPARATUS FOR PRODUCING UNIFORM BLOCKS OF ICE

[75] Inventor: Everett S. Ottman, Denton, Tex.

[73] Assignee: Turbo Refrigerating Company, Denton, Tex.

[21] Appl. No.: 832,962

[22] Filed: Sep. 14, 1977

[51] Int. Cl.$^{2}$ .......... B29G 1/00

[52] U.S. Cl. .......... 425/256; 425/DIG. 54; 425/352

[58] Field of Search ....... 425/256, 257, 352, DIG. 54; 222/447

[56] References Cited

U.S. PATENT DOCUMENTS

| | | | |
|---|---|---|---|
| 229,247 | 6/1880 | Gregg | 425/256 |
| 530,526 | 12/1894 | Holden | 425/256 X |
| 1,197,821 | 9/1916 | Hamachek | 222/447 X |
| 1,270,937 | 7/1918 | Gibbons | 222/447 X |
| 3,923,440 | 12/1975 | Bettonica | 425/352 X |

FOREIGN PATENT DOCUMENTS

| | | | |
|---|---|---|---|
| 676837 | 8/1952 | United Kingdom | 425/256 |

*Primary Examiner*—Richard B. Lazarus

*Attorney, Agent, or Firm*—McDougall, Hersh & Scott

[57] ABSTRACT

A machine for compacting particles of ice to form a composite block in which a volume of ice particles in measured amount is delivered from a feed hopper into a tubular member in advance of a compacting ram for displacement of the ice particles by the ram to a compacting section which is closed at the open dispensing end of the tubular member by a second ram which forms one wall of the compacting chamber when in blocking position and which enables the displacement of the formed block of ice for delivery when in unblocking position.

6 Claims, 6 Drawing Figures

APPARATUS FOR PRODUCING UNIFORM BLOCKS OF ICE

This invention relates to the production of uniform blocks of ice and means for metering ice particles in uniform amounts for the production thereof.

Ice fragments and other particulate forms of ice are produced in large volume by flake ice machines of various types and small pieces of ice or snow are also available in large quantities from ice cutting and chipping operations. Recovery of such ice fragments and particles are sought to be achieved by the formation of such particles and fragments into solid blocks, as by compression molding and the like. However, it has been found that volumetric measurement that senses only the top of a mound of ice is subject to large fluctuations because of the large variations in the angle of repose at the top of the ice pile.

It is an object of this invention to provide a means and method for metering ice fragments and particles of the type described for volumetric determination of an amount of ice that is relatively uniform, and it is a related object to combine such metering operation with compaction means to produce ice blocks of uniform weight and dimension from the ice fragments and particles.

These and other objects and advantages of this invention will hereinafter appear and, for purposes of illustration, but not of limitation, an embodiment of the invention is shown in the accompanying drawings in which.

Figure 1:
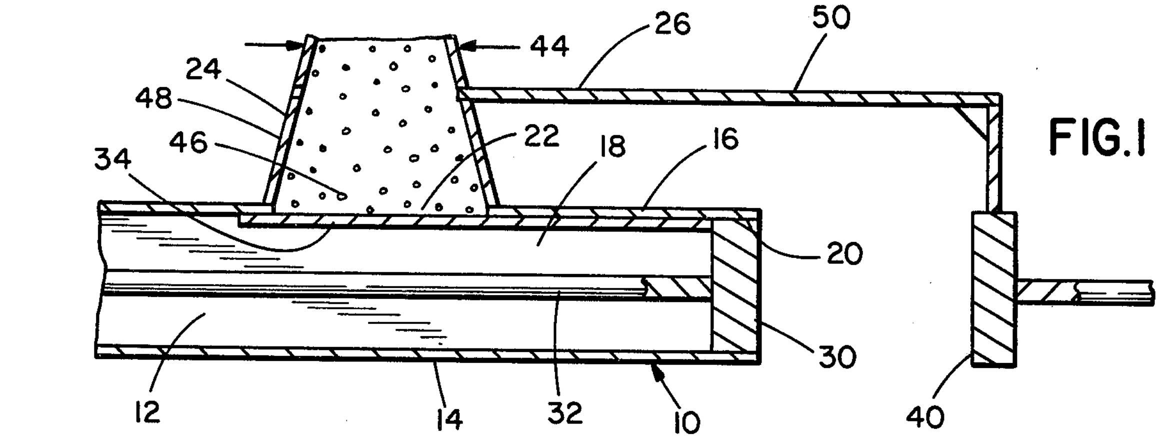
FIG. 1 is a schematic drawing of the apparatus showing the relationship of parts at an initial state of operation.

Briefly described, the ice compacting and block forming device of this invention comprises an elongate housing 10 of tubular shape, preferably rectangular in cross section with side walls 12, bottom wall 14 and top wall 16 to define a passage 18 which extends continuously through the housing to an open forward end 20. The top wall 16 is provided with a feed opening 22 spaced rearwardly from the open end 20 of the housing and which communicates with the interior of the housing. A hopper 24 of pyramidal shape extends upwardly from the top wall 16 with the base of the pyramid corresponding in size and shape to the feed opening 22.

The hooper 24 is provided with a horizontally disposed separating plate 26 mounted in guides or grooves (not shown) in the side walls of the hopper for guiding the plate 26 in horizontal sliding movement between a blocking position (shown in FIGS. 2 and 4) and unblocking position (shown in FIG. 1) in which the plate is withdrawn from the interior of the hopper. The plate 26 is mounted for sliding movement between blocking and unblocking position at a level above the top wall 16 of the housing to define a spaced relation therebetween for measurement of a substantially uniform volume of ice particles to be compacted into the block of ice, as hereinafter described.

Figure 3:
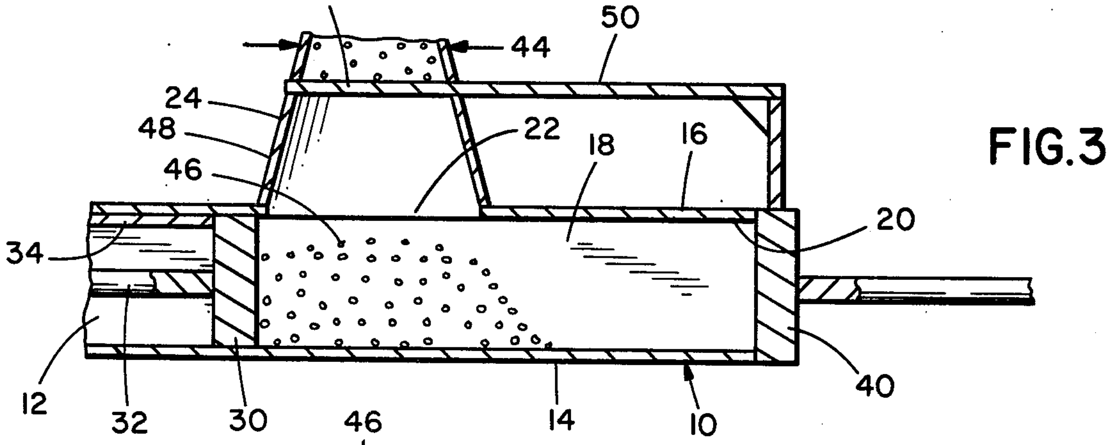
FIG. 3 is the same as FIGS. 1 and 2, showing the relationship of the elements in a subsequent step in the process.

A ram 30 is provided within the passage 18 for lengthwise sliding movement as a piston in engagement with the inner walls of the housing between a retracted position, rearwardly of the feed opening, as shown in FIG. 3, to a fully operated position at the open end 20 of the housing, as shown in FIG. 1. The ram is connected by a rod 32 with conventional actuating means, such as a hydraulic piston and cylinder arrangement 43, hydraulic jack, actuating screw or the like actuating means for displacement of the ram 30 between retracted and operated positions.

Extending rearwardly from the ram and movable therewith in abutting relationship with the bottom side of the top wall 16 is a plate 34 having a width corresponding to the width of the feed opening 22 and a length greater than the distance between the open end 20 of the housing and the rear edge of the feed opening 22 so that, when the ram is between the open end 20 of the housing and the forward edge of the feed opening, the trailing plate 34 will extend across the feed opening to block communication between the hopper 24 and the interior 18 of the tubular housing 10 and will thus function as the bottom wall of the hopper.

Figure 2:
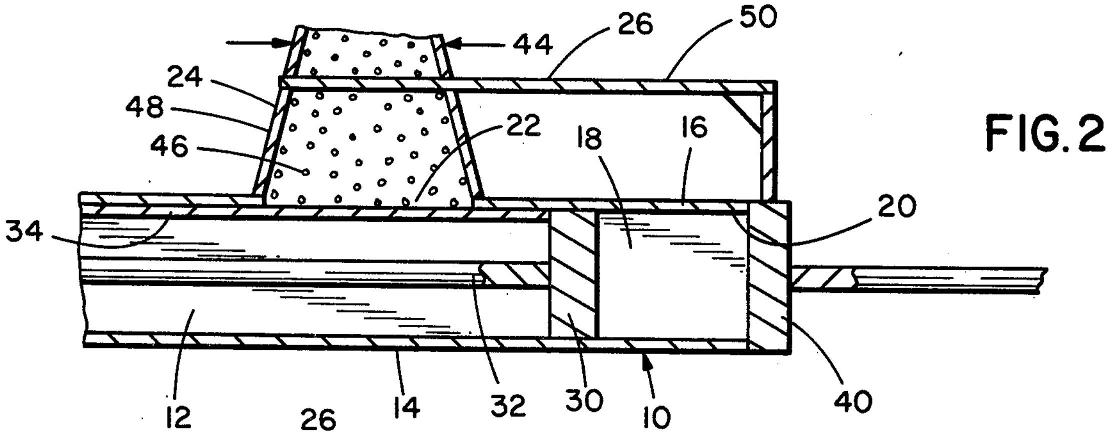
FIG. 2 is the same as FIG. 1, showing the relationship of elements upon completion of a first step in the process.
Figure 4:
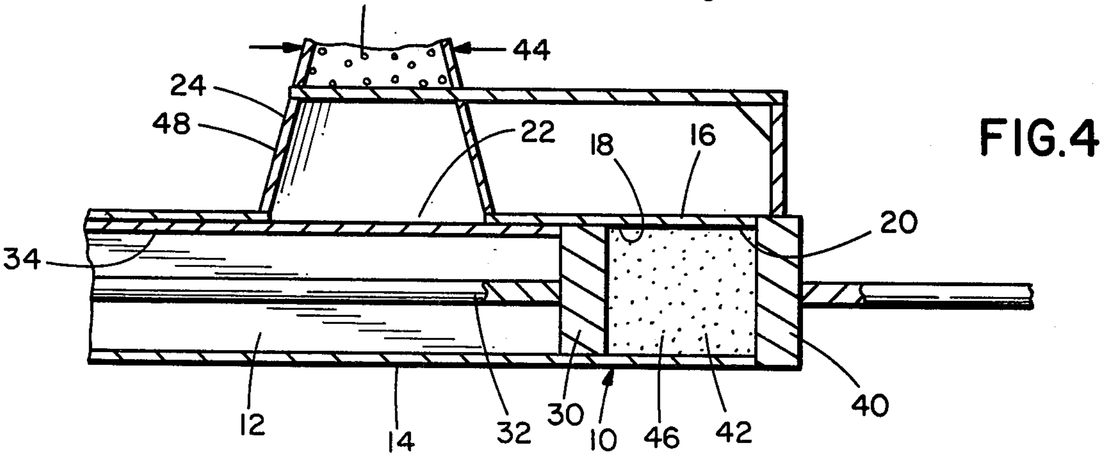
FIG. 4 is the same as FIGS. 1, 2 and 3, showing the relationship of elements in a final stage of the process.
Figure 5:
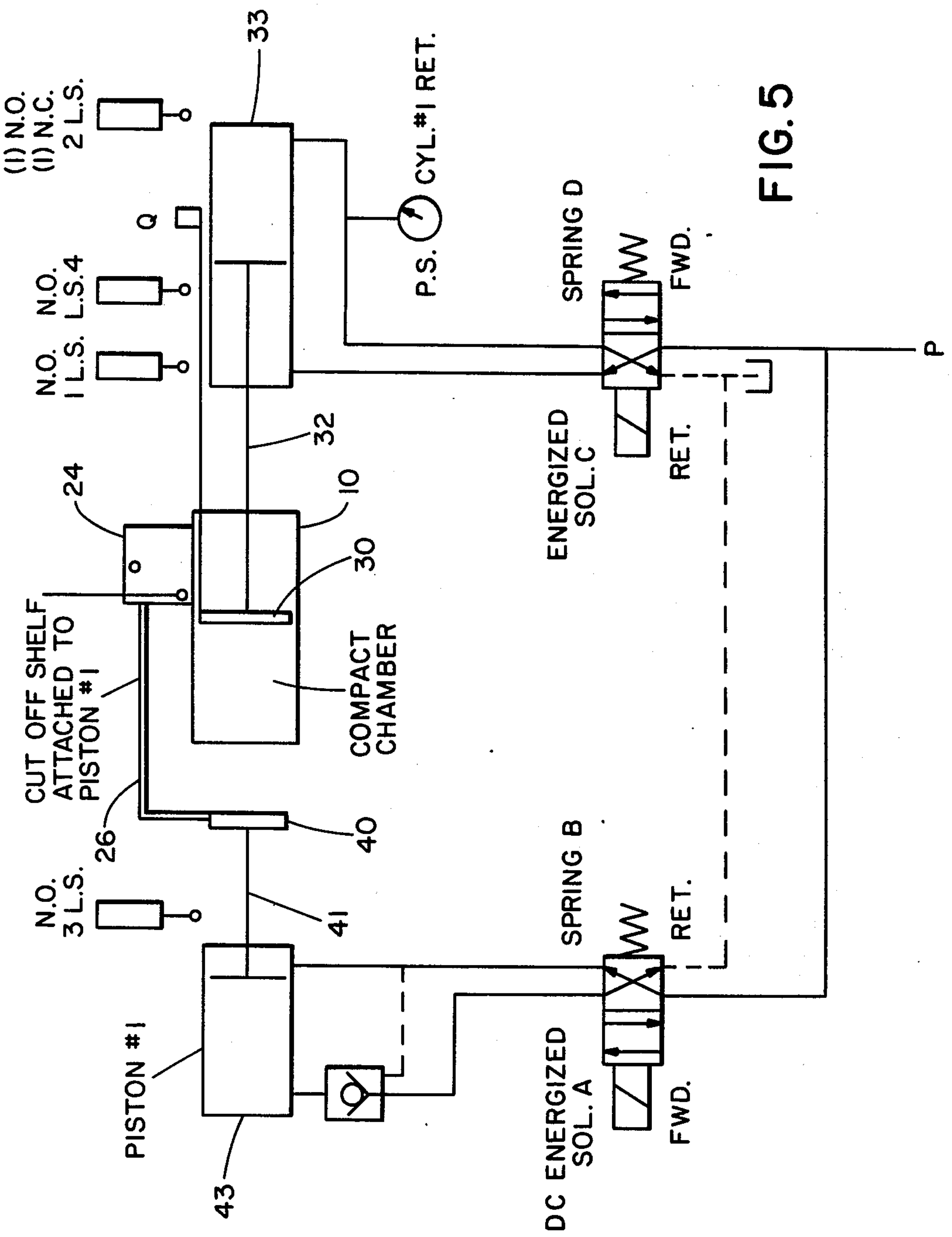
FIG. 5 is a schematic diagram showing the apparatus and controls.
Figure 6:
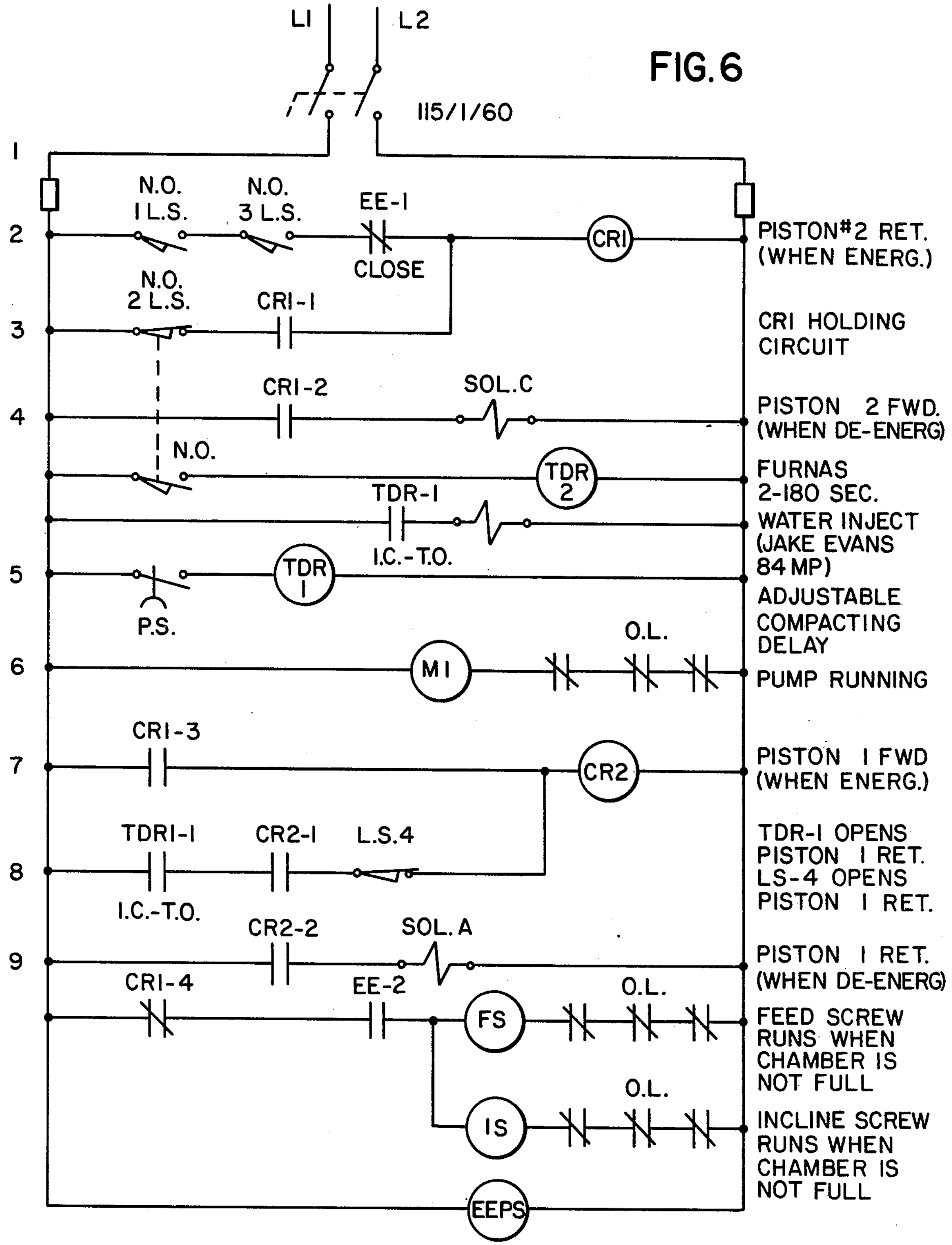
FIG. 6 is an electrical diagram for the apparatus embodying the features of this invention.

A second ram 40 is mounted in endwise alignment with the tubular housing 10 for reciprocal movement between blocking position in engagement with the open end 20 of the housing, as shown in FIGS. 2, 3 and 4, and retracted position in which the ram is spaced from the housing by an amount greater than the length of the compacted block of ice that is formed, as shown in FIG. 1, to enable the block of ice 42 to be displaced by ram 30 through the open end 20 of the housing for delivery to a receiving means (not shown).

A sensing means, such as a light beam 44 or other feeler means, is provided at a level above the shelf 26 to terminate the feed of ice particles 46 into the hopper when the hopper is filled to the desired level. Since the ice particles tend to form into a mound, the sensing means 44 is located a sufficient distance above the shelf 26 to make certain that the spread from the top of the mound will extend to the walls of the hopper at least at the level of the shelf 26 so that the volume of ice entrapped below the shelf will be relatively constant.

The hopper 24 is preferably formed with tapered side and end walls 48 with the base of the hopper of pyrimidal shape at the bottom thereby to prevent blockages that might otherwise occur and thereby to insure complete emptying of the measured volume of ice particles from the hopper 24 into the passage 18 of the underlying tubular housing 10 when the ram 30 is in retracted position.

In the illustrated modification, the slide plate 26 is connected by rod 50 for conjoint movement with the ram 40 between blocking and unblocking position. It will be understood, however, that the slide plate 26 may be separately actuated for movement between blocking and unblocking position to enable filling of the hopper with ice during any period of time after the ram 30 has been forwardly displaced to beyond the feed opening and plate 34 is in position to function as the bottom wall of the feed hopper.

The operation of the ice compacting and block forming device will now be described with reference to a cycle beginning with the delivery of a cake of ice from the housing 18. At this stage, shown in FIG. 1 of the drawing, the ram 30 is in its operated position adjacent the open end 20 of the passage 18 with the trailing plate 34 underlying to close the feed opening 22 and thus to define the bottom wall of the hopper 24.

Solenoid C is energized to cause the flow of pressure fluid into the head end of the piston and cylinder arrangement 33 to cause retraction of ram 30. At the same time solenoid A is energized to cause fluid to flow into the base end of fluid and piston arrangement 43 to cause displacement of the ram 40 from retracted position to blocking position. Since the ram 40 has a much shorter stroke than the retraction movement of the ram 30, ram 40 completes its movement to blocking position before ram 30 enters in feed opening 22 so that the shelf 16 will cut across the hopper 24 to isolate a metered volume of ice before the hopper communicates with the passage 18.

As ram 30 continues this retraction, it clears the feed opening 22 so that the metered volume of ice particles will fall gravitationally from the hopper into the compacting chamber 18, as shown in FIG. 3. Upon completion of the return stroke of the ram 30, the limit switch 2LS is engaged to energize the solenoid C for the flow of pressure fluid into the base end of the piston 33 for displacement of the piston 30 from retracted position towards its operating position, pushing the metered volume of ice forwardly into the compacting chamber portion of the housing in advance of the feed opening. When about two-thirds of the stroke of ram 30 has been completed and the ice is compacted, limit switch LS4 is made to cause piston 30 to hold for a short period of time to enable consolidation of the ice particles into a solid compact under the compression between the actuating ram 30 and the ram 40 blocking the open end of the chamber. At this time water can be sprayed onto the ice particles if additional binding is desired, but it is preferred to apply such water for binding by means of a spray as the ice particles flow from the hopper 24 into the compacting chamber 18.

After the timed delay, both the solenoid A is deenergized and the solenoid C is energized to cause movement of the ram 30 forwardly to operated position while the ram 40 moves rearwardly to retracted position, as shown in FIG. 1, whereby the formed cake of ice is displaced from the compacting chamber.

Upon return of the ram 40 to retracted position, shelf 26 is withdrawn from blocking to unblocking position. This enables ice particles collected above the shelf 26 to fall down into the hopper. As the ice level falls to below the activating level, control 44 is made and activates the feed mechanism for refilling the hopper with ice particles until a level above the shelf has been reached and the control 44 is again operated to discontinue the feed.

It will be apparent that retraction of ram 30 and extension of ram 40 will not take place until the ice is up to activating level and the level sensor 44 has become energized.

Then a new cycle of operation can begin by movement of ram 40 to operating position to block the open end 20 of the compacting chamber 18 while causing displacement of the shelf 26 to cut off the measured volume of ice in the hopper. The making of the limit switch LS3, upon reaching blocking position, enables operation of the cylinder 33 for movement of the ram 30 in the forward direction towards the blocking position.

Instead of connecting the partitioning plate 26 directly with the ram 40 for movement conjointly therewith between blocking and unblocking positions, the partitioning plate 26 can be mounted for displacement between blocking and unblocking position independently of the ram. For such purpose, separate actuating means, such as a hydraulic cylinder, jack or the like is mounted operatively to engage the plate 26. Under such circumstances, the partitioning plate can be actuated for displacement from hlocking to unblocking position after passage of the ram beyond the feed opening to enable ice particles to be fed into the hopper during the continued forward stroke of the ram 30 for compacting and ejecting the formed ice cake, thereby correspondingly to shorten the time cycle.

Instead of the ram 40 being dimensioned to abut the open end of the tubular housing to form one wall of the compaction chamber in which the ice is compressed to form the ice cake, the ram 40 may be dimensioned to conform with the passage 18 to project into the passage, when in operated position, to block the open end of the tubular housing and to provide a supported wall against which the ice is compressed during cake formation.

In practice, it has been possible to achieve consistency in the size and weight of blocks of ice produced with less than 5% and most often less than 2% variation in weight.

It will be apparent from the foregoing that the apparatus may be adapted for continuous operation in the transformation of flakes or particles of ice into compact selfsufficient cakes.

It will be understood that changes may be made in the details of construction, arrangement and operation without departing from the spirit of the invention, especially as defined in the following claims.

I claim:

1. A machine for compacting ice particles to form a composite block of ice comprising a hollow tubular member open at one end and having a top wall with a feed opening in which the feed opening is spaced rearwardly from the open end of the tubular member by an amount greater than the length of the ice block, a ram mounted for movement in the tubular member as a piston between retracted position rearwardly of the feed opening and actuated position at the open end of the tubular member, means for actuating the ram between retracted and actuated positions, a second ram mounted in endwise alignment with the hollow tubular member for movement between blocking position at the open end of the tubular member and retracted position spaced forwardly from the open end of the tubular member, and means for actuating the second ram between blocking and retracted positions, a feed hopper on the top side of the tubular member having an outlet opening in the bottom in communication with the feed opening through the top wall of the tubular member with the hopper of pyramidal shape having its base of larger dimension at the bottom in registry with the feed opening through the top wall of the tubular member, a partitioning plate mounted for sliding movement across a portion of the hopper spaced from the outlet between blocking position and unblocking position, means for feeding ice particles into the feed hopper, means for actuating the slide plate to blocking position when the feed opening is closed and the level of ice particles exceeds the level of the slide plate and for actuating the slide plate to unblocking position after the ice particles below the slide plate have been allowed to flow through the feed opening into the tubular member and the feed opening has again been closed, a blocking plate adjacent the underside of the top wall of the tubular member so as to form the bottom wall of the hopper and extending rearwardly of the ram for rebound movement therewith to block the feed opening when the ram is forwardly of the feed opening and to unblock the feed opening when the ram is rearwardly of the feed opening.

2. A machine as claimed in claim 1 in which the hollow tubular member is of rectilinear shape and the feed opening is in the top wall of the rectilinear shaped tubular member.

3. A machine as claimed in claim 2 in which the ram and the second ram are both of rectilinear shape.

4. A machine as claimed in claim 1 in which the feed opening through the top wall of the tubular member is of the same dimension as the opening at the base of the hopper.

5. A machine as claimed in claim 1 in which the second ram is spaced from the open end of the tubular member by an amount greater than the length of the block of ice when in retracted position.

6. A machine for compacting ice particles to form a composite block of ice comprising a hollow tubular member open at one end and having a top wall with a feed opening in which the feed opening is spaced rearwardly from the open end of the tubular member by an amount greater than the length of the ice block, a ram mounted for movement in the tubular member as a piston between retracted position rearwardly of the feed opening and actuated position at the open end of the tubular member, means for actuating the ram between retracted and actuated positions, a second ram mounted in endwise alignment with the hollow tubular member for movement between blocking position at the open end of the tubular member and retracted position spaced forwardly from the open end of the tubular member, and means for actuating the second ram between blocking and retracted positions, a feed hopper on the top side of the tubular member having an outlet opening in the bottom in communication with the feed opening through the top wall of the tubular member, a partitioning plate mounted for sliding movement across a portion of the hopper spaced from the outlet between blocking position and unblocking position, means for feeding ice particles into the feed hopper, means for actuating the slide plate to blocking position when the feed opening is closed and the level of ice particles extends across the hopper at the level of the slide plate and for actuating the slide plate to unblocking position after the ice particles below the slide plate have been allowed to flow through the feed opening into the tubular member and the feed opening has again been closed, a blocking plate underlying the top wall of the tubular member to block the feed opening when the ram is forwardly of the feed opening and to unblock the feed opening when the ram is rearwardly of the feed opening, and in which the slide plate is connected to the second ram for movement therewith to blocking and unblocking position responsive to movement of the second ram to blocking and retracted positions respectively.

* * * * *